United States Patent
Briese et al.

(10) Patent No.: US 10,316,578 B2
(45) Date of Patent: Jun. 11, 2019

(54) SPACER FRAME AND METHOD OF MAKING SAME

(71) Applicant: GED INTEGRATED SOLUTIONS, INC., Twinsburg, OH (US)

(72) Inventors: William Briese, Hinckley, OH (US); Clifford J. Weber, Richfield, OH (US)

(73) Assignee: GED Integrated Solutions, Inc., Twinsburg, OH (US)

( * ) Notice: Subject to any disclaimer, the term of this patent is extended or adjusted under 35 U.S.C. 154(b) by 0 days.

(21) Appl. No.: 15/224,783

(22) Filed: Aug. 1, 2016

(65) Prior Publication Data

US 2016/0340962 A1    Nov. 24, 2016

Related U.S. Application Data

(62) Division of application No. 14/703,027, filed on May 4, 2015, now Pat. No. 9,428,953.

(Continued)

(51) Int. Cl.
| | | |
|---|---|---|
| *E06B 3/663* | (2006.01) | |
| *E06B 3/673* | (2006.01) | |
| *E04B 1/00* | (2006.01) | |
| *E04B 1/10* | (2006.01) | |
| *E04B 5/10* | (2006.01) | |

(52) U.S. Cl.
CPC ............ *E06B 3/66309* (2013.01); *E04B 1/00* (2013.01); *E04B 1/10* (2013.01); *E04B 5/10* (2013.01); *E06B 3/67313* (2013.01); *Y10T 29/49982* (2015.01)

(58) Field of Classification Search
CPC ........... E06B 3/673085; E06B 3/67313; E06B 3/66309; E06B 3/663; E06B 3/66371; E06B 2003/66395
See application file for complete search history.

(56) References Cited

U.S. PATENT DOCUMENTS

| 4,222,209 A | 9/1980 | Peterson |
| 4,513,546 A | 4/1985 | Gow |

(Continued)

FOREIGN PATENT DOCUMENTS

| DE | 102004027527 A1 | 8/2005 |
| WO | WO2005/075783 A1 | 8/2005 |

OTHER PUBLICATIONS

Written Opinion of the International Searching Authority for PCT Application No. PCT/US2016/020437, dated Jul. 28, 2016 (14 pages).

(Continued)

*Primary Examiner* — Beth A Stephan

(74) *Attorney, Agent, or Firm* — Tarolli, Sundheim, Covell & Tummino LLP; John A. Yirga, Esq.

(57) ABSTRACT

A spacer frame assembly and method of assembly includes a substantially linear channel having first and second ends. The substantially linear channel that when assembled includes at least four sides and corresponding corners between each of the sides. The spacer frame assembly also has a connecting structure located at one of the first and second ends and an opposite frame end located at the other of the one of first and second ends. The opposite frame end has an inner channel for receiving a nose portion of the connecting structure. The spacer frame assembly also includes a stop extending from the connecting structure for locating the opposite frame end when in the assembled position.

3 Claims, 18 Drawing Sheets

Related U.S. Application Data

(60) Provisional application No. 62/011,253, filed on Jun. 12, 2014.

(56) References Cited

U.S. PATENT DOCUMENTS

| | | | |
|---|---|---|---|
| 4,628,582 A | 12/1986 | Leopold | |
| 4,822,205 A | 4/1989 | Berdan | |
| 5,105,591 A | 4/1992 | Leopold | |
| 5,177,916 A | 1/1993 | Misera et al. | |
| 5,295,292 A | 3/1994 | Leopold | |
| 5,313,761 A | 5/1994 | Leopold | |
| 5,361,476 A | 11/1994 | Leopold | |
| 5,439,716 A | 8/1995 | Larsen | |
| 5,531,047 A | 7/1996 | Leopold | |
| 5,644,894 A | 7/1997 | Hudson | |
| 5,678,377 A | 10/1997 | Leopold | |
| 5,813,191 A | 9/1998 | Gallagher | |
| 7,021,110 B2 | 4/2006 | Rosskamp | |
| 7,448,246 B2 | 11/2008 | Briese et al. | |
| 7,610,681 B2 | 11/2009 | Calcei et al. | |
| 7,739,851 B2 | 6/2010 | Davis et al. | |
| 7,802,365 B2 | 9/2010 | McGlinchy | |
| 7,827,761 B2 | 11/2010 | Buchanan et al. | |
| 7,856,791 B2 | 12/2010 | Rosskamp et al. | |
| 7,950,194 B2 | 5/2011 | Rosskamp et al. | |
| 8,001,742 B2 | 8/2011 | Briese et al. | |
| 8,056,234 B2 | 11/2011 | Calcei | |
| 8,057,120 B2 | 11/2011 | Wemlund et al. | |
| 8,474,400 B2 | 7/2013 | McGlinchy | |
| 8,652,382 B2 | 2/2014 | Eggert et al. | |
| 8,720,026 B2 | 5/2014 | McGlinchy | |
| 8,904,611 B2 | 12/2014 | Calcei | |
| 9,212,515 B2 | 12/2015 | Calcei | |
| 9,428,953 B2 | 8/2016 | Briese et al. | |
| 2006/0075719 A1 | 4/2006 | James et al. | |
| 2007/0261795 A1 | 11/2007 | Rosskamp | |
| 2011/0027606 A1 | 2/2011 | Lenhardt | |
| 2012/0137608 A1 | 6/2012 | Plant et al. | |
| 2013/0051902 A1 | 2/2013 | Kelley et al. | |
| 2014/0124979 A1 | 5/2014 | Eggert et al. | |
| 2014/0260491 A1 | 9/2014 | Briese et al. | |

OTHER PUBLICATIONS

Written Opinion of the International Searching Authority for PCT Application No. PCT/US2015/030310, dated Aug. 10, 2015 (9 pages).
International Search Report for PCT Appl. PCT/US2015/030310, dated Aug. 10, 2015 (11 pages).
One (1) page Technical Service Bulletin published by Cardinal IG in May 2008 entitled Insulating Glass Durability.
One (1) page photograph of a box spacer frame having a connection located from a corner using a key insert, the box spacer frame shown in the photograph was on sale more than one year prior to the filing date of the subject application,namely Jun. 12, 2013.
English Translation of Foreign Patent Document No. DE 102004027527 A1, Published on Aug. 18, 2005, Patentee, Karl Lenhardt. Equivalent of WO2005/075783A1 (29 pages).
Office Action in corresponding Canadian application dated Sep. 15, 2017. (3 pages).
Supplementary European Search Report and Examiner's Report for EP15806949.2, dated Dec. 22, 2017. (8 pages).
Search Report in corresponding Russian Application No. 2017100466 dated Nov. 19, 2018. (7 pages).
Search Report in corresponding European Application No. EP15806949.2 dated Aug. 14, 2018 (4 pages).

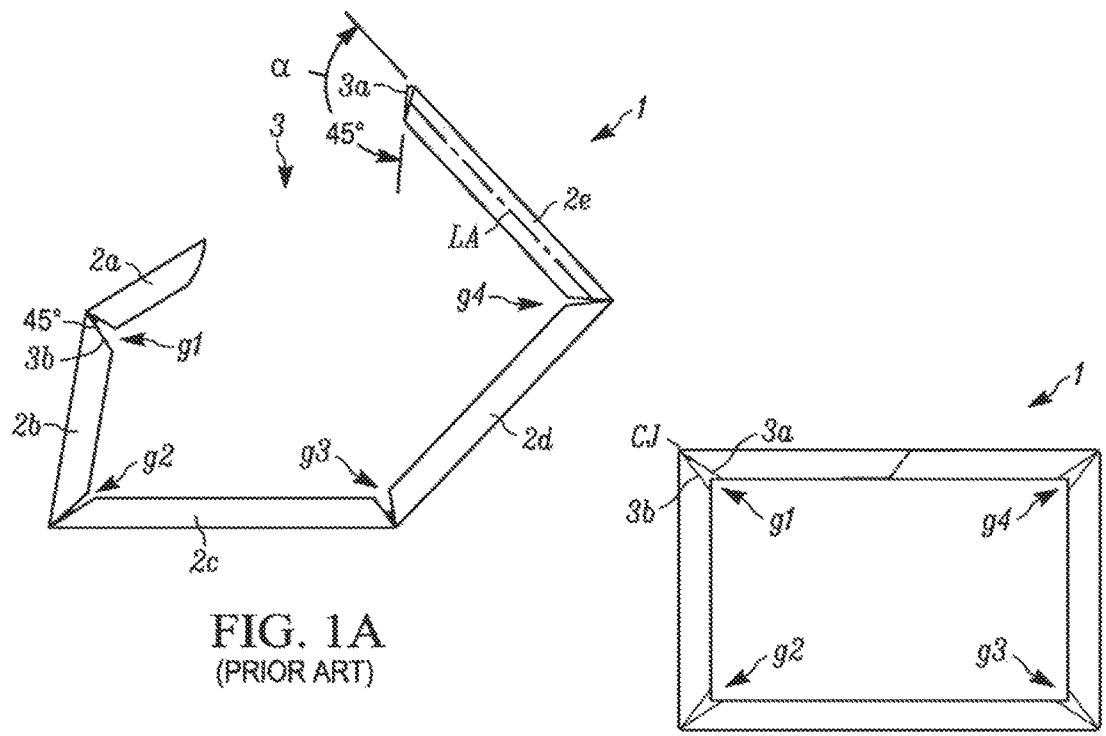
FIG. 1A (PRIOR ART)
FIG. 1B (PRIOR ART)
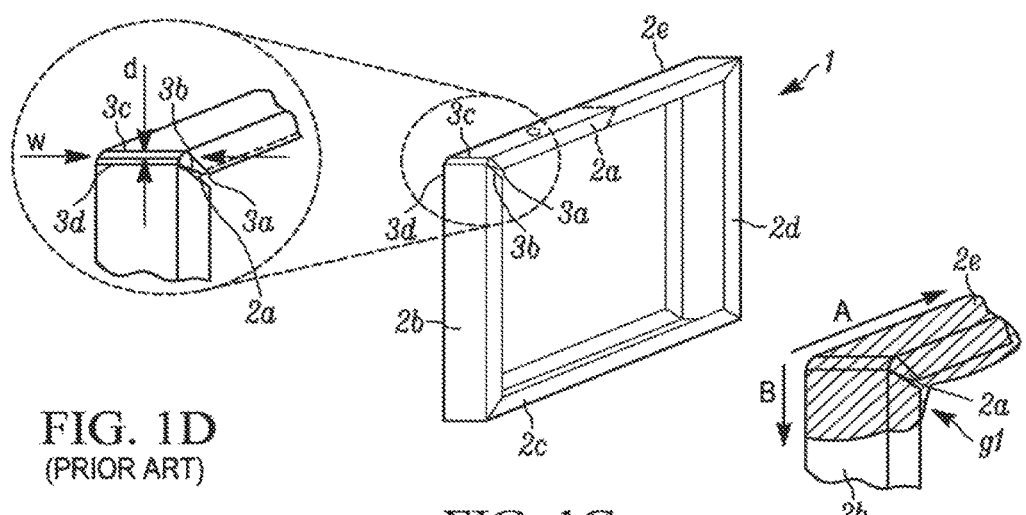
FIG. 1D (PRIOR ART)
FIG. 1C (PRIOR ART)
FIG. 1E (PRIOR ART)

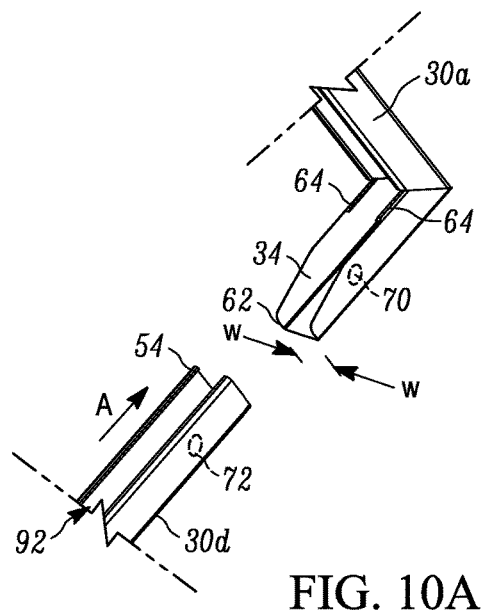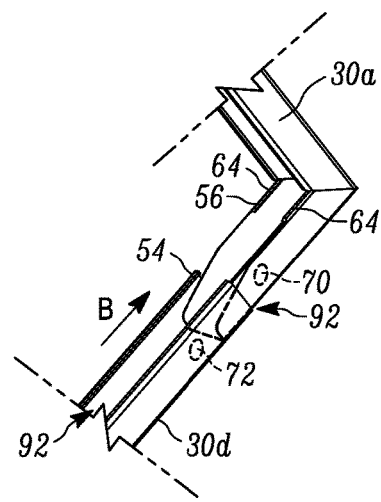
FIG. 10A  FIG. 10B
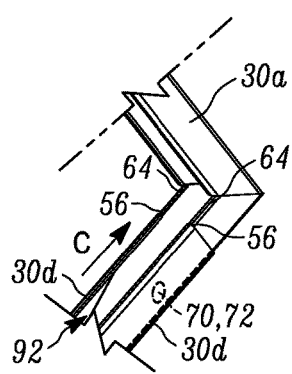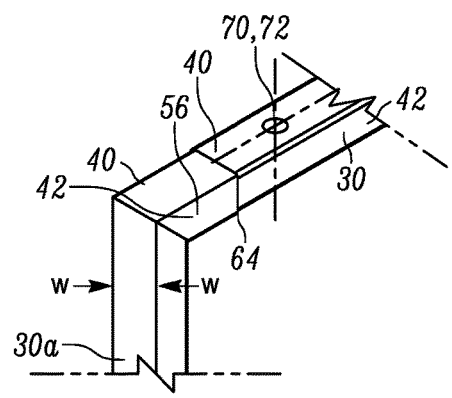
FIG. 10C  FIG. 10D

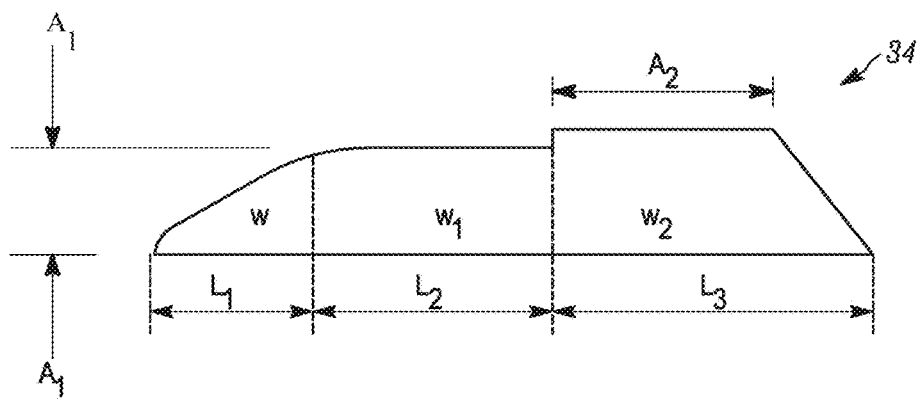
FIG. 10H
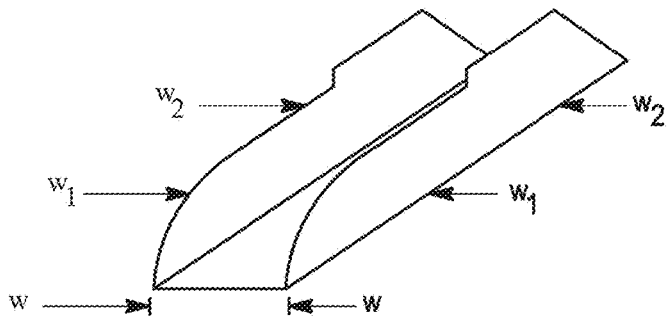
FIG. 10I
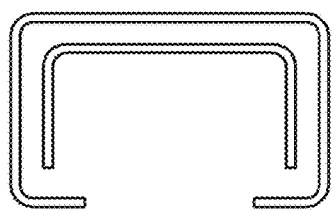 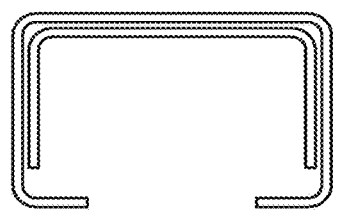
FIG. 10J            FIG. 10K

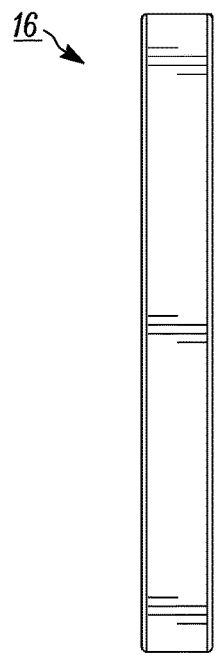
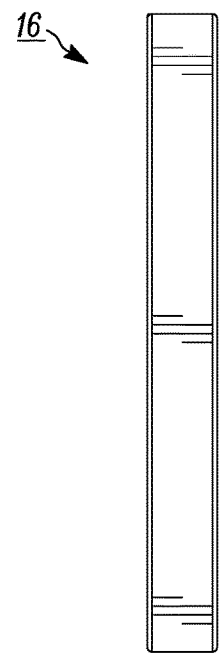
FIG. 18        FIG. 19
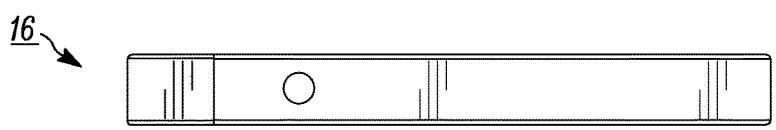
FIG. 20
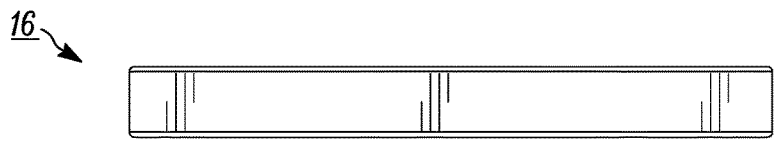
FIG. 21

SPACER FRAME AND METHOD OF MAKING SAME

CROSS REFERENCE TO RELATED APPLICATIONS

The present application is a divisional application claiming priority under 35 U.S.C. § 121 to U.S. nonprovisonal application Ser. No. 14/703,027 that was filed on May 4, 2015 and published on Dec. 17, 2015 under publication number US-2015-0361713 entitled SPACER FRAME AND METHOD OF MAKING SAME, which was a non-provisional application filed under 35 U.S.C. § 111 claiming priority under 35 U.S.C. § 119(e) to U.S. provisional application Ser. No. 62/011,253 filed on Jun. 12, 2014 entitled SPACER FRAME AND METHOD OF MAKING SAME. Priority is claimed to all of the above-identified applications and publications, which all are also incorporated herein by reference in their entireties for all purposes.

FIELD OF DISCLOSURE

The present disclosure relates to a spacer frame and method of making same, and more specifically, a spacer frame and fabrication process for use with an insulating glass unit ("IGU").

BACKGROUND

Insulating glass units ("IGUs") are used in windows to reduce heat loss from building interiors during cold weather. IGUs are typically formed by a spacer assembly sandwiched between glass lites. A spacer assembly usually comprises a frame structure extending peripherally about the unit, a sealant material adhered both to the glass lites and the frame structure, and a desiccant for absorbing atmospheric moisture within the unit. The margins of the glass lites are flush with or extend slightly outwardly from the spacer assembly. The sealant extends continuously about the frame structure periphery and its opposite sides so that the space within the IGUs is hermetic.

There have been numerous proposals for constructing IGUs. One type of IGU was constructed from an elongated corrugated sheet metal strip-like frame embedded in a body of hot melt or sealant material. Desiccant was also embedded in the sealant. The resulting composite spacer was packaged for transport and storage by coiling it into drum-like containers. When fabricating an IGU, the composite spacer was partially uncoiled and cut to length. The spacer was then bent into a rectangular shape and sandwiched between conforming glass lites.

Perhaps the most successful IGU construction has employed tubular, roll formed aluminum or steel frame elements connected at their ends to form a square or rectangular spacer frame. The frame sides and corners were covered with sealant (e.g., butyl material, hot melt, reactive hot melt, or modified polyurethane) for securing the frame to the glass lites. The sealant provided a barrier between atmospheric air and the IGU interior which blocked entry of atmospheric water vapor. Particulate desiccant deposited inside the tubular frame elements communicated with air trapped in the IGU interior to remove the entrapped airborne water vapor and thus preclude its condensation within the unit. Thus, after the water vapor entrapped in the IGU was removed internal condensation only occurred when the unit failed.

In some cases the sheet metal was roll formed into a continuous tube, with desiccant inserted, and fed to cutting stations where "V" shaped notches were cut in the tube at corner locations. The tube was then cut to length and bent into an appropriate frame shape. The continuous spacer frame, with an appropriate sealant in place, was then assembled in an IGU.

Alternatively, individual roll formed spacer frame tubes were cut to length and "corner keys" were inserted between adjacent frame element ends to form the corners. In some constructions the corner keys were foldable so that the sealant could be extruded onto the frame sides as the frame moved linearly past a sealant extrusion station. The frame was then folded to a rectangular configuration with the sealant in place on the opposite sides. The spacer assembly thus formed was placed between glass lites and the IGU assembly completed.

IGUs have failed because atmospheric water vapor infiltrated the sealant barrier. Infiltration tended to occur at the frame corners because the opposite frame sides were at least partly discontinuous there. For example, frames where the corners were formed by cutting "V" shaped notches at corner locations in a single long tube. The notches enabled bending the tube to form mitered corner joints; but afterwards potential infiltration paths extended along the corner parting lines substantially across the opposite frame faces at each corner.

Likewise in IGUs employing corner keys, potential infiltration paths were formed by the junctures of the keys and frame elements. Furthermore, when such frames were folded into their final forms with sealant applied, the amount of sealant at the frame corners tended to be less than the amount deposited along the frame sides. Reduced sealant at the frame corners tended to cause vapor leakage paths.

In all these proposals the frame elements had to be cut to length in one way or another and, in the case of frames connected together by corner keys, the keys were installed before applying the sealant. These were all manual operations which limited production rates. Accordingly, fabricating IGUs from these frames entailed generating appreciable amounts of scrap and performing inefficient manual operations.

In spacer frame constructions where the roll forming occurred immediately before the spacer assembly was completed, sawing, desiccant filling and frame element end plugging operations had to be performed by hand which greatly slowed production of units.

U.S. Pat. No. 5,361,476 to Leopold discloses a method and apparatus for making IGUs wherein a thin flat strip of sheet material is continuously formed into a channel shaped spacer frame having corner structures and end structures, the spacer thus formed is cut off, sealant and desiccant are applied and the assemblage is bent to form a spacer assembly. U.S. Pat. No. 5,361,476 is incorporated herein by reference in its entirety.

U.S. Pat. No. 7,448,246 to Briese et al. further describes the process of corner fabrication of a spacer frame. U.S. Pat. No. 8,720,026 to McGlinchy discusses additional methods of producing spacer frames. Both U.S. Pat. Nos. 7,448,246 and 8,720,026 are incorporated herein by reference in their entireties.

Illustrated in FIGS. 1A-1E is a conventional spacer frame 1 fabricated for IGUs. The conventional spacer frame 1 is typically fabricated from an elongated metal strip and roll-formed into the orientation shown. The conventional spacer frame 1 includes five different legs, 2a, 2b, 2c, 2d, and 2e. Leg 2a is a tab that when the spacer frame is assembled is inserted into leg 2e to form a corner juncture or connection at CJ. Legs 2b-2e make up the four sides of the spacer frame. When the spacer frame is bent from a linear strip into the four-sided frame (as illustrated by the transition from FIGS. 1A-1B) the leg 2e includes a chamfered end 3, typically as an angle α of 45 degrees from a longitudinal axis "LA" that extends along the center of leg 2e. This allows the tab leg 2a to be completely inserted into leg 2e until end sides 3a and 3c of the leg 2e bottom out on corresponding ends 3b and 3d to form corner juncture CJ.

In the assembled position, the conventional spacer frame 1 includes four gaps g1, g2, g3, and g4. The gap g1 is formed by the legs 2a and 2b and the passage the sliding of leg 2e over the leg 2a at end 3 of the corner juncture CJ. FIG. 1e illustrates that the conventional spacer frame typically requires the passage of hot melt or sealant 4 along directions A and B along the end of the frame such that the corner juncture CJ is sealed along two directions.

Conventional spacer frames 1 if found defective, that is, allowing the passage of gas through an undesirable leak, such defect typically occurs where the one end 3a engages corner gap g1 at the corner juncture. Failure at the corner juncture CJ can occur for a number of reasons. One likely reason is that leg 2e is oversized for assembly and the gap "d" can average fifty-thousands of one inch (0.050"), as illustrated in FIG. 1D. As well, the width of leg 2e must be greater in size for assembly than the width of tab or leg 2a to allow leg 2e to easily slide over tab or leg 2a. Thus, a gap is also possible along width "w", as also illustrated in FIG. 1D.

SUMMARY

One aspect of the disclosure comprises a spacer frame assembly and method of assembly that includes a substantially linear channel having first and second ends. The substantially linear channel that when assembled includes at least four sides and corresponding corners between each of the sides. The spacer frame assembly also has a connecting structure located at one of the first and second ends and an opposite frame end located at the other of the one of first and second ends. The opposite frame end has an inner channel for receiving a nose portion of the connecting structure. The spacer frame assembly also includes a stop extending from the connecting structure for locating the opposite frame end when in the assembled position.

Another aspect of the present disclosure includes a method of making a spacer frame assembly for bending into a multi-sided window or door spacer frame comprising the steps of: providing a supply of narrow metal strip coiled on a support; unwinding the metal strip from the support to provide an elongated metal strip and moving the elongated metal strip along a path of travel to a stamping station; stamping the strip at spaced apart corner locations by removing portions of the strip at the corner locations wherein inter-fitting leading and trailing ends of the spacer frame assembly are defined by a lead portion of the strip extending in front of a first corner location and a trailing portion of the strip extending behind a second corner location; additionally stamping at least one of the lead and trailing portions of the strip to form an abutment stop comprising a wide portion of the strip and a nose which extends into the wide portion of the strip for defining an amount of overlap of the leading and trailing ends an assembled spacer frame; roll forming the strip to form a channel shaped structure having side walls that include the abutment stop and a base wall extending between the side walls; and severing the frame assembly from the elongated metal strip.

While another aspect of the present disclosure includes a spacer frame assembly for bending into a multi-sided window or door spacer frame comprising an elongated metal strip bent to form a channel shaped frame element having a base wall that extends between two generally parallel side walls wherein the side walls include spaced apart corner locations defined by notches that extend from an edge of the metal strip into the side walls and wherein telescoping leading and trailing ends of the frame element are defined by a lead portion of the frame element in front and spaced from a first corner location and a trailing portion of the frame element behind and spaced from a second corner location wherein at least one of the lead and trailing portions of the frame element include an abutment stop defined by a notch which extends into a side wall of the frame element, the abutment stop for limiting movement of the leading and trailing ends as the leading and trailing ends are telescoped one within the other and thereby define a lateral connection spaced from the corners and an amount of overlap of the leading and trailing ends of the assembled spacer frame.

BRIEF DESCRIPTION OF THE SEVERAL VIEWS OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 1A is an elevation construction view of a conventional spacer frame;

FIG. 1B is an elevation assembled view of the conventional spacer frame of FIG. 1A;

FIG. 1C is a perspective assembled view of the conventional spacer frame of FIG. 1A;

FIG. 1D is a magnified view of the assembled view of a portion of the conventional spacer frame of FIG. 1C;

FIG. 1E is a perspective assembled view of the conventional spacer frame of FIG. 1A, illustrating the required application of sealant;

FIG. 7 is a fragmentary elevation view of a space frame forming part of the unit of FIG. 1 which is illustrated in a partially constructed condition;

FIG. 10A is another perspective disassembled view of a spacer frame assembly constructed in accordance with another example embodiment of the present disclosure;

FIG. 10B is a partially assembled perspective view of the spacer frame assembly of FIG. 10A;

FIG. 10C is an assembled perspective view of the spacer frame assembly of FIGS. 10A and 10B;

FIG. 10D is a partial perspective view of an assembled spacer frame assembly of FIGS. 10A-10C;

FIG. 10H is a side elevation view of a portion of connecting structure or tab constructed in accordance with one example embodiment of the present disclosure;

FIG. 10I is an end perspective view of FIG. 10H;

FIG. 10J is an end view of a conventional spacer frame assembly;

FIG. 10K is an end view of a spacer frame assembly constructed in accordance with one example embodiment of the present disclosure;

FIG. 18 is a left side elevation view thereof;

FIG. 19 is a right side elevation view thereof;

FIG. 20 is a top plan view thereof;

FIG. 21 is a bottom plan view thereof;

Figure 2:
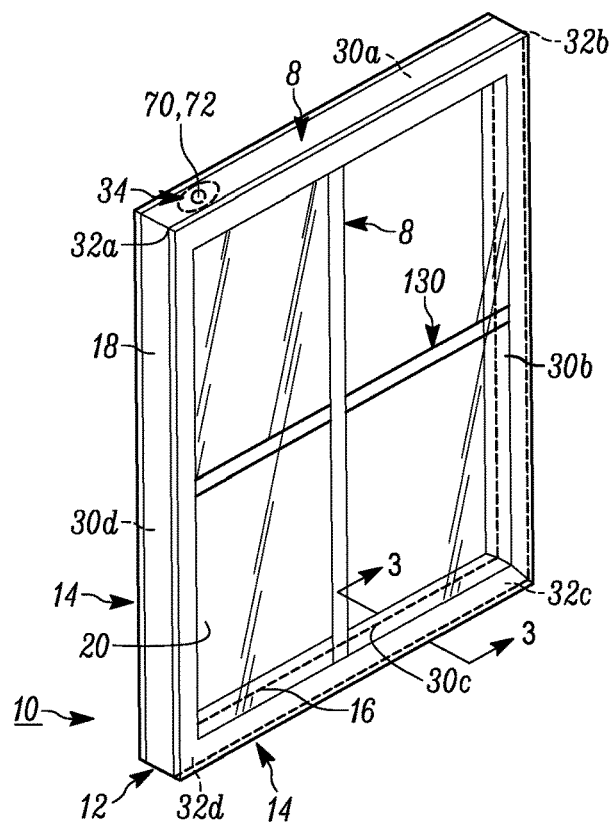
FIG. 2 is a perspective view of an insulating glass unit including glass lites.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements having similar characteristics and operational properties throughout unless otherwise noted. The present disclosure relates to a spacer frame and method of making same, and more specifically, a spacer frame and fabrication process for use with an insulating glass unit ("IGU").

The drawing Figures and following specification disclose a method and apparatus for producing elongated window components 8 (see FIG. 2) used in insulating glass units 10. Examples of elongated window components include spacer frame assemblies 12 and muntin bars 130 that form parts of insulating glass units 10. The IOU components 8 are formed in one example embodiment from a production line which forms sheet metal ribbon-like stock material into muntin bars and/or spacers carrying sealant and desiccant for completing the construction of insulating glass units.

Figure 2A:
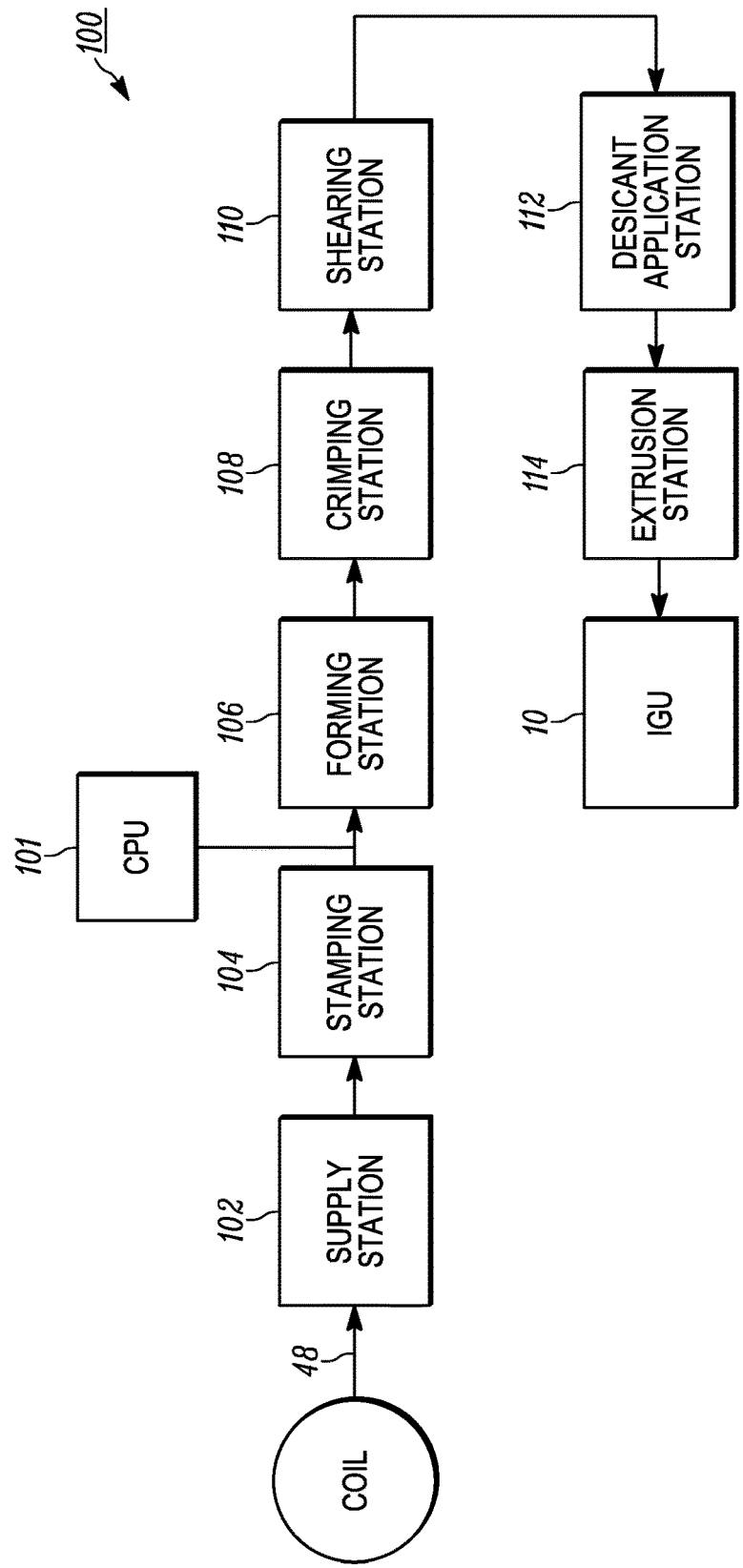
FIG. 2A is a schematic block diagram of a production line for manufacturing a spacer frame in accordance with one example embodiment of the present disclosure.

Illustrated in FIG. 2A is a schematic block diagram of a production line for manufacturing a conventional spacer frame and insulating glass unit as further described in U.S. Pat. No. 7,610,681, which is incorporated herein by reference. The production line 100 may be used to fabricate the insulating glass units 10 and spacer frame assemblies 12 of the present disclosure. A stock strip 48 of material is fed endwise from a coil from a supply station into the production line 100 and substantially completed elongated window components 8 emerge from the other end of the line.

The production line 100 comprises a stock supply station 102, a stamping station 104 where various notches, hole indentations or lines of weaknesses, and tab profiles are punched into flat stock 48, a forming station 106 where the flat stock 48 is roll formed to make a u-shaped channel, a crimping station 108 where corners are formed and swaging is performed on the u-shaped channel, a shearing 110 station where the individual spacer frames are separated from the flat stock and cut to length, a desiccant application station 112 where desiccant is applied between glass lites and the interior region formed by the lites and spacer frame assembly, and an extrusion station 114 where sealant is applied to the yet to be folded frame.

With reference to the operation of the stamping station 104, dies on opposite side of the strip 48 are driven into contact with the metal strip by an air actuated drive cylinder enclosed within the stamping station. In the illustrated embodiment, two air actuated cylinders drive a die support downward, moving spaced apart dies into engagement with the strip 48 to form the punch strip 36, which is backed by an anvil in the region of contact with the dies. Due to the need to fabricate spacer frame assemblies 12 of different width between the side walls, 42, 44, the dies are movable with respect to each other so that the region of contact between die and strip 48 is controlled. Similarly, when the nose portion or tab 34 of the spacer frame assembly 12 is formed, separate dies on opposite sides of the strip 48 engage the punch strip 36 at controlled locations to form the nose profile seen in FIG. 4A. When the width of the spacer frame between the side walls 42, 44 changes the relative position of these two dies is also adjusted. In the exemplary embodiment, stamping of the nose or tab 34 occurs at a separate time from stamping of the corners at the notches 50. Stated another way, the four corners 32 are formed by a first die set controlled by controller 101 that also controls each station of the production line 100 and the nose or tab 34 is formed at another time by a separated air cylinder drive that moves a separate die pair into contact with the punch strip 36. Coordination of these separate actuations is controlled by movement of punch the strip 36 through the stamping station 104 to appropriate positions for forming the corners and the nose portion of the spacer frame.

Figure 3:
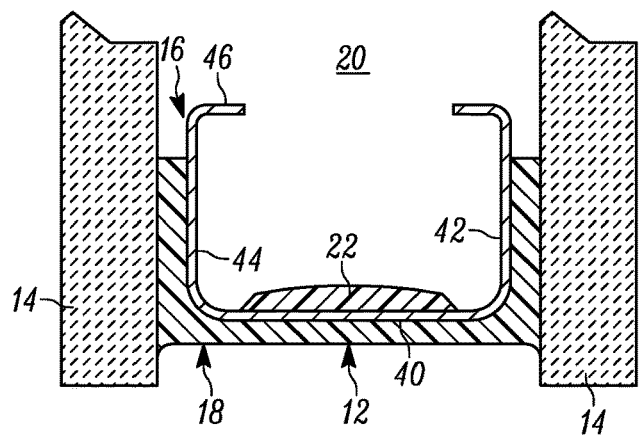
FIG. 3 is a cross sectional view seen approximately from the plane indicated by the line 3-3 of FIG. 2.

An insulating glass unit 10 illustrated in FIG. 2 is constructed using the method and apparatus further described in FIG. 2A as discussed above and in U.S. Pat. Nos. 8,720,026 and 7,448,246, which are both incorporated herein by reference. In FIGS. 2-6 the IOU 10 comprises a spacer frame assembly 12 sandwiched between glass sheets, or lites, 14. The spacer frame assembly 12 comprises a frame structure 16, sealant material 18 for hermetically joining the frame to the lites to form a closed space 20 within the unit 10 and a body 22 of desiccant in the space 20, as illustrated in FIG. 3. The insulating glass unit 10 is illustrated in FIG. 1 as in condition for final assembly into a window or door frame, not illustrated, for ultimate installation in a building. The unit 10 illustrated in FIG. 2 includes muntin bars 130 that provide the appearance of individual window panes.

The assembly 12 maintains the lites 14 spaced apart from each other to produce the hermetic insulating "insulating air space" 20 between them. The frame 16 and the sealant body 18 co-act to provide a structure which maintains the lites 14 properly assembled with the space 20 sealed from atmospheric moisture over long time periods during which the unit 10 is subjected to frequent significant thermal stresses. The desiccant body 22 removes water vapor from air, or other volatiles, entrapped in the space 20 during construction of the unit 10.

The sealant body 18 both structurally adheres the lites 14 to the spacer assembly 12 and hermetically closes the space 20 against infiltration of airborne water vapor from the atmosphere surrounding the unit 10. The illustrated body or sealant 18 is formed from a number of different possible materials, including for example, butyl material, hot melt, reactive hot melt, modified polyurethane sealant, and the like, which is attached to the frame sides and outer periphery to form a U-shaped cross section.

The spacer frame assembly 16 extends about the unit periphery to provide a structurally strong, stable spacer for maintaining the lites aligned and spaced while minimizing heat conduction between the lites via the frame. In one example embodiment, the spacer frame 16 comprises a plurality of spacer frame segments, or members, 30a-d connected to form a planar, polygonal frame shape, element juncture forming frame corner structures 32a-d, and connecting structure or tab 34 for joining opposite frame element ends or tail 30d to complete the closed frame shape (see FIG. 7).

Each frame member 30 is elongated and has a channel shaped cross section defining a peripheral wall 40 and first and second lateral walls 42, 44. See FIGS. 2 and 6. The peripheral wall 40 extends continuously about the unit 10 except where the connecting structure or tab 34 joins the frame member end 30d. The lateral walls 42, 44 are integral with respective opposite peripheral wall 40 edges. The lateral walls 42, 44 extend inwardly from the peripheral wall 40 in a direction parallel to the planes of the lites and the frame. The illustrated frame 16 has stiffening flanges 46 formed along the inwardly projecting lateral wall 42, 44 edges. The lateral walls 42, 44 add rigidity to the frame member 30 so it resists flexure and bending in a direction transverse to its longitudinal extent. The flanges 46 stiffen the walls 42, 44 so they resist bending and flexure transverse to their longitudinal extents.

The frame is initially formed as a continuous straight channel constructed from a thin ribbon of metal or flat stock 48. One example of suitable metal includes stainless steel material having a thickness of 0.006-0.010 inches. Other materials, such as galvanized, tin plated steel, or aluminum, plastic, or foam may also be used to construct the channel without departing from the spirit and scope of the present disclosure.

Figure 4A:
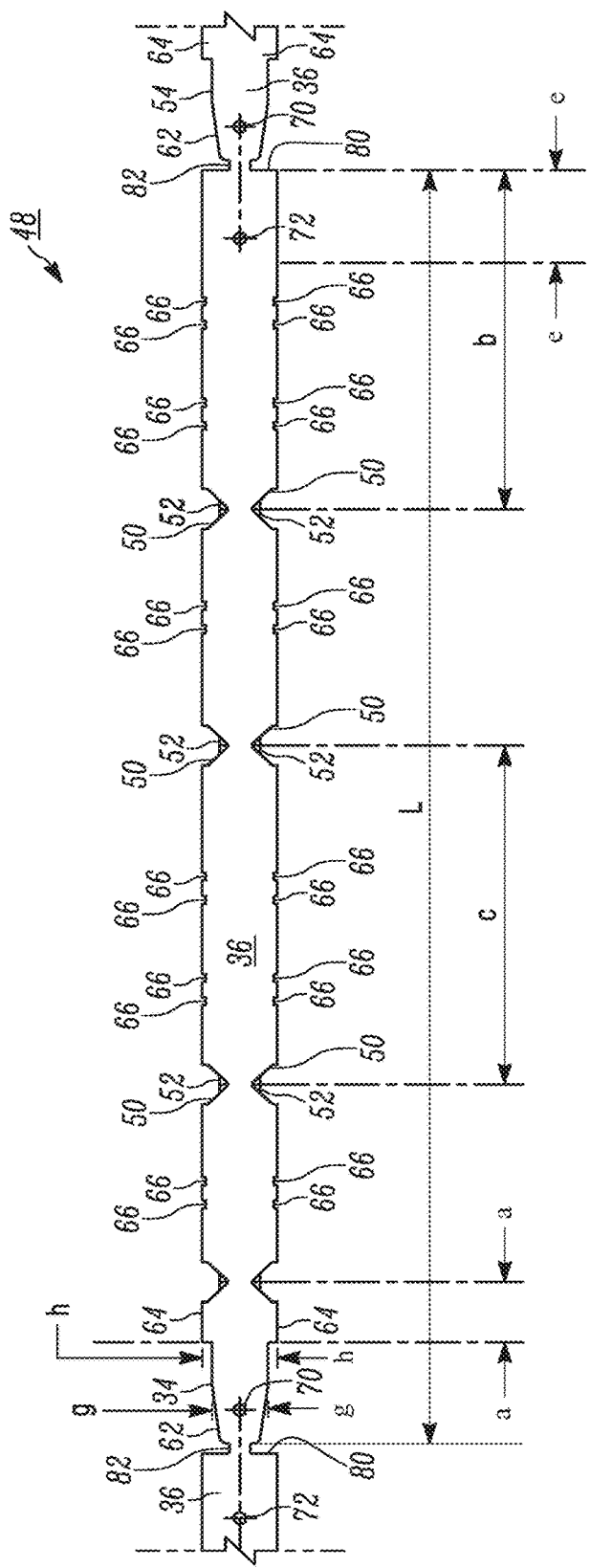
FIG. 4A is a plan view of flat stock after a punching operation that will be formed into one or more spacer frame assemblies before the flat stock is roll formed or has sealant applied.

Illustrated in FIG. 4A is a continuous metal ribbon or flat stock 48 after it has passed through a stamping station and punched by a number of dies to form notches 50 and weakening zones 52 for corner folds 32, clip notches 66 (used in securing mutin bars), tab or connecting structure 34, nose 62, apertures 70, 72, and end cut 80. The punch strip 36 of flat stock forms a single spacer frame assembly 16 as illustrated in repeating sections by dimension "L" from the continuous strip 48. The punch strip 36 is eventually sheared to make a spacer frame assembly 16 at end 80 and the nose 62, leaving scrap piece 82. Alternatively, the punching or shearing operation is a single hit operation in which the width of the shear equals that of scrap piece 82, leaving no scrap or need for a double hit operation. Further discussion relating to the shearing or punching operation is discussed in U.S. Pat. No. 8,720,026, which is incorporated herein by reference.

The nose or tab 34 and stops 64 are formed by stamping dies at a stamping station 104 as described above. Shown by dimension "g" in one example embodiment is a nose or tab 34 width, which is smaller than the width of the stop 64 illustrated by dimension "h" in FIG. 4A. In one example embodiment, the width of the nose or tab 34 shown by dimension a is one inch 1.00" and the width of the stops 64 shown by dimension b is one and three sixteenths of one inch 1.187". Thus, the difference between the width of the nose 34 and stops 64 of the above example embodiment is approximately ninety-three thousands 0.093" of one inch from the outside edge of the strip.

Clip notches 66 are formed to support flexible clips that reside within the spacer frame assembly 16 and IGU once assembled. The flexible clips are used to support, for example, mutin bars as further discussed in U.S. Pat. No. 5,678,377, which is incorporated herein by reference. Notches 50 and weakening zones 52 are punched and crimped into the continuous strip 48, allowing for the formation of the corner structures 32. Further discussion of the punching and crimping operations is discussed in U.S. Pat. No. 7,448,246, which is incorporated by reference.

Figure 4B:
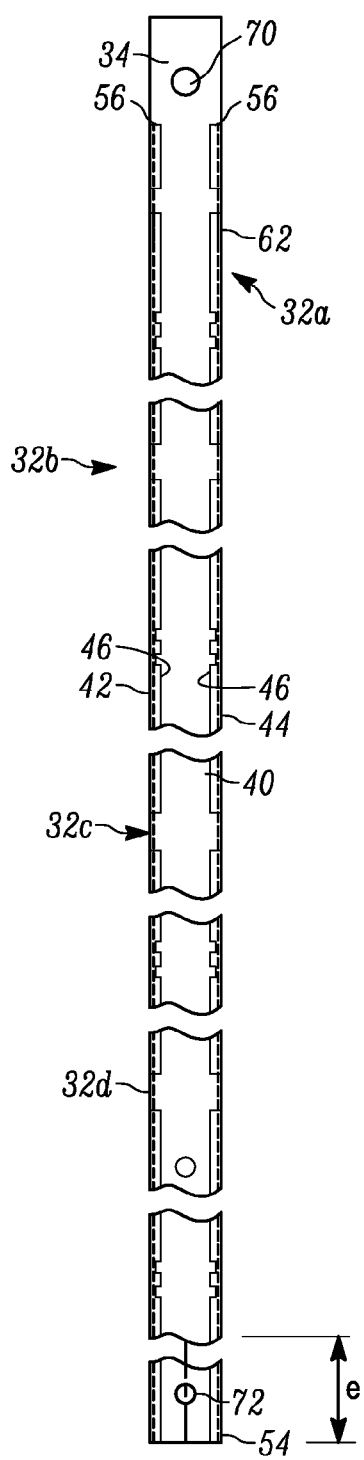
FIG. 4B is a plan view of the spacer frame assembly of FIG. 4A after a roll forming operation in an unfolded condition.
Figure 5:
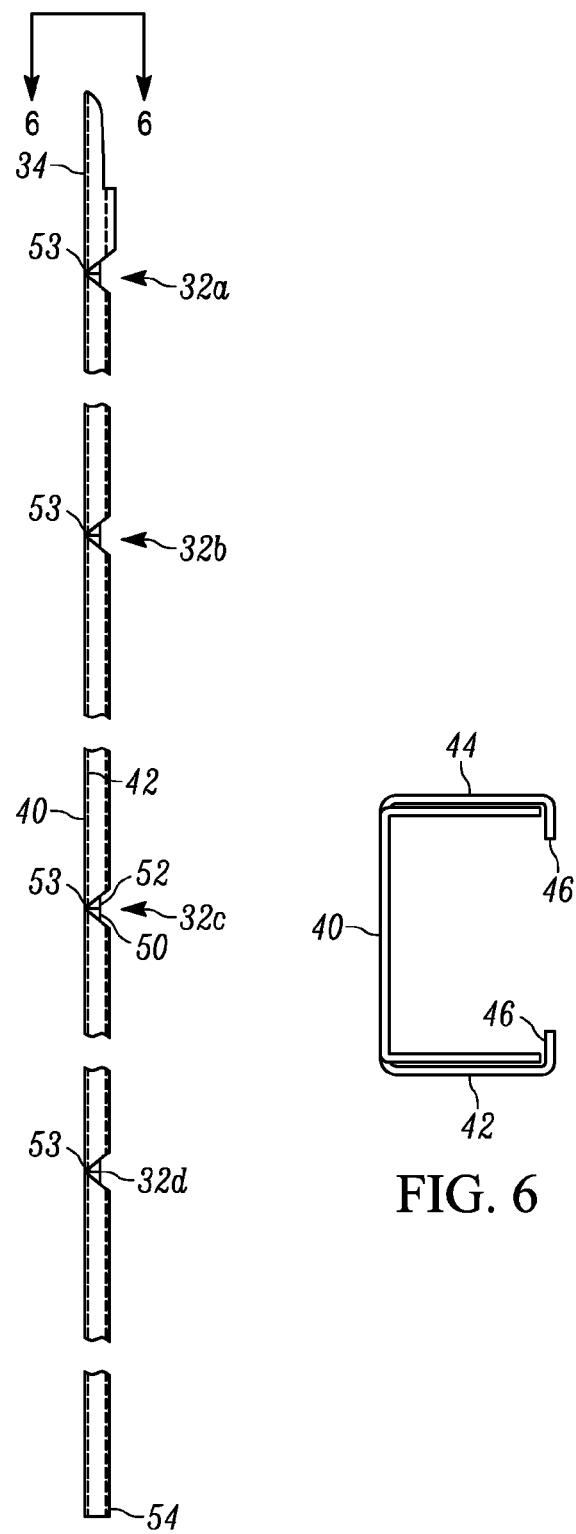
FIG. 5 is side elevation view of the spacer frame assembly of FIG. 4B.
Figure 6:
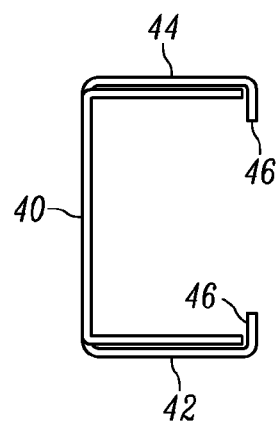
FIG. 6 is an enlarged elevation view seen approximately from the plane indicated by the line 6-6 of FIG. 5.
Figure 8:
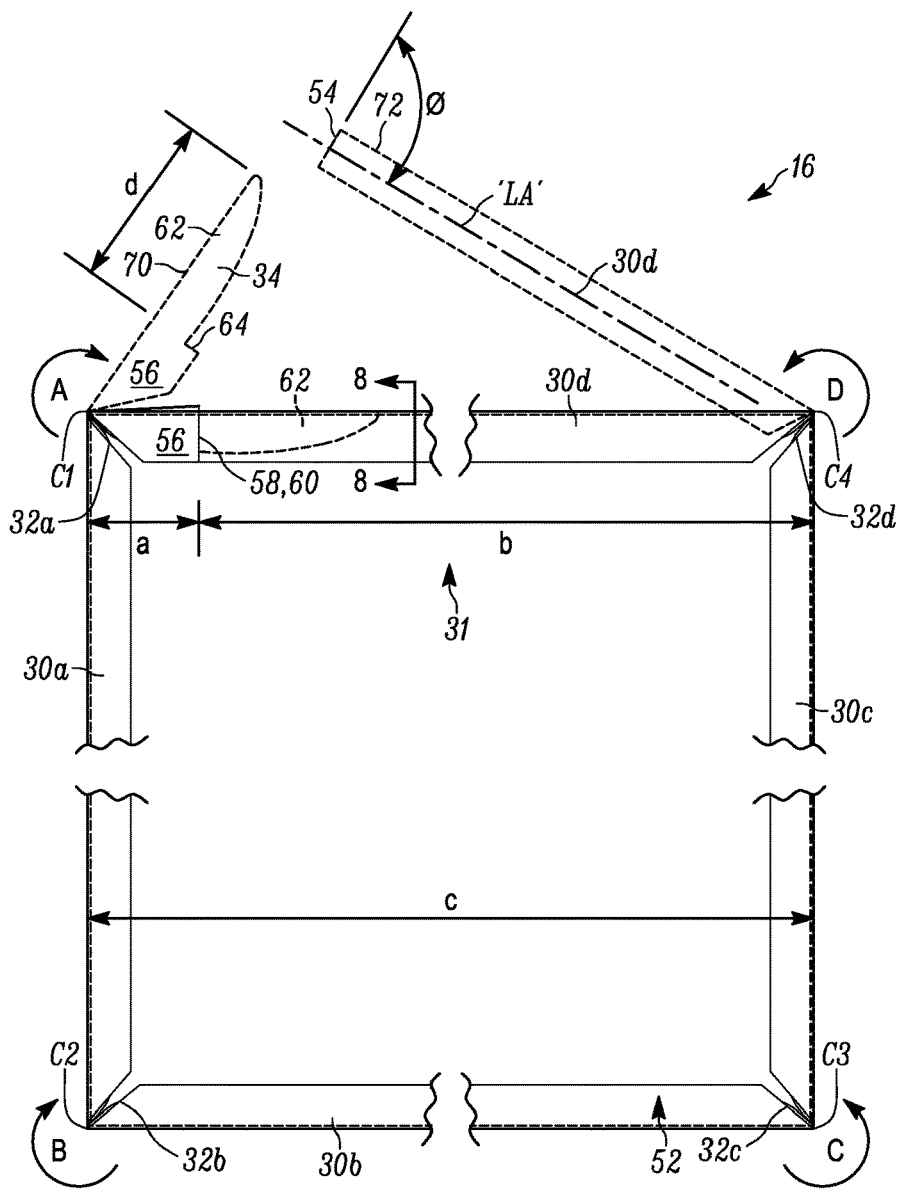
FIG. 8 is a section view of FIG. 7 along section lines 8-8.
Figure 8:
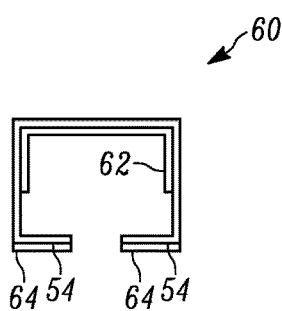

Before the punch strip 36 is sheared from the continuous strip 48, it is roll formed to the configuration illustrated in FIGS. 4B, 5 and 6, creating peripheral wall 40, lateral walls 42, 44, and stiffening flanges 46. Further discussion as to the roll forming operation is discussed in U.S. Pat. No. 8,904, 611, which is incorporated herein by reference.

The corner structures 32 are formed to facilitate bending the frame channel to the final, polygonal frame configuration in the unit 10 while assuring an effective vapor seal at the frame corners, as seen in FIGS. 2 and 7. The sealant body 18 is applied and adhered to the channel before the corners are bent. The corner structures 32 initially comprise notches 50 and weakened zones 52 formed in the walls 42, 44 at frame corner locations. See FIGS. 3-5. The notches 50 extend into the walls 42, 44 from the respective lateral wall edges. The lateral walls 42, 44 extend continuously along the frame 16 from one end to the other. The walls 42, 44 are weakened at the corner locations because the notches reduce the amount of lateral wall material and eliminate the stiffening flanges 46 and because the walls are stamped to form a line of weakness 53 (see FIG. 5) to weaken them at the corners and inward flexing as the corners are formed.

The connecting structure or tab 34 secures an opposite frame end 54 or leg member 30d together with a first frame end 56 when the spacer frame assembly 16 has been bent to its final configuration. That is, rotating the linear spacer frame assembly 16 segments or members 30 (from the linear configuration of FIGS. 4B and 5) in the direction of arrows A, B, C, and D as illustrated in FIG. 7 and particularly, inserting a nose 62 of the connecting structure or tab 34 into the channel formed at the opposite end 54 of segment 30d with concomitant rotation of the segments (arrows A-D). This concomitant rotation continues until the channel of segment 30d at the opposite end 54 engages positive stops 64 in the connecting structure 34 first frame end 56 forming a telescopic union 58 and lateral connection 60 to make a compound lateral leg 31.

The telescopic union 58 and lateral connection 60 are along the lateral leg 31 spaced from the corner structures 32, which in the illustrated example embodiment of FIG. 7 the completed frame corner is C1. When assembled, the telescopic union 58 maintains the frame in its final polygonal configuration prior to assembly of the insulating glass unit 10. The compound lateral leg 31 has a length of dimensions "a" (first frame end 56 from the corner C1 to the end of the stop 64) plus "b" (the fourth frame segment or member 30d), which equals the length of dimension "c" (see FIG. 7), the length of a second and opposite side segment 30b. Dimension "b" in the illustrated example embodiment, is the length of segment 30d and dimension "a" is the length of the connecting structure 34 less the length of the nose 62 (dimension d) that is inserted into the channel formed in segment 30d.

In the illustrated example embodiment, the connector structure 34 further comprises a first aperture 70 and corresponding second aperture 72 in the segment 30d for a fastener arrangement (not shown) for both connecting the opposite frame end 54 with the first frame end 56 and providing a temporary vent for the evacuation of air or insertion of gas into the space 20 while the unit 10 is being fabricated. The apertures 70 and 72 are automatically aligned because of the configurable dimensions A and B that when summed equal C (see FIG. 7) when the frame ends 54, 56 are properly telescoped together and the end 54 engages stops 64. The stops 64 reassure concentric alignment of the apertures 70, 72.

The stops 64 further reassure a repeatable length of the telescopic union of the lateral connection 60. This advantageously reassures that all four corner structures 32 are identical in spacing, size, angle orientation, and construction, thus reducing the potential for failure. In conventional spacer frames without the union 58 and lateral connection 60, over and under extension of the corners readily occurs. This over and under extension in convention frames is in part because of differences in tolerances because the last connecting leg 2e (see FIGS. 1C-1D) fails to bottom out, leaving a gaps d and w in FIG. 1D.

Figure 7A:
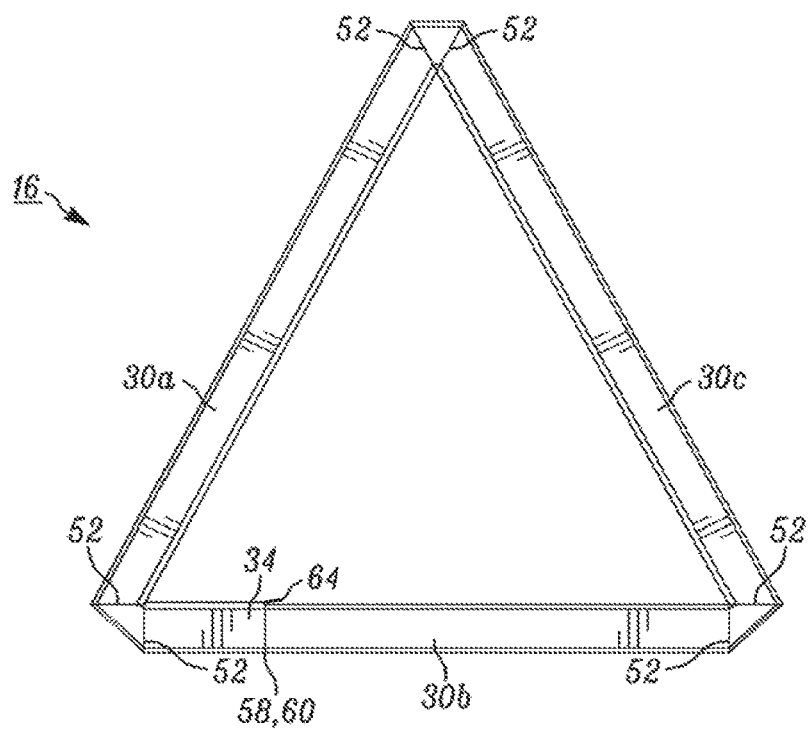
FIG. 7A is an elevation view of a three sided spacer frame constructed in accordance with one example embodiment of the present disclosure.

FIG. 7A is an elevation view of a three sided spacer frame assembly 16 constructed in accordance with one example embodiment of the present disclosure. The three sided 30a, 30b, and 30c frame 16 includes a connecting structure or tab 34, a lateral connection 60 spaced from a corner, union point 58, and stops 64 of similar construction of the example embodiment of FIG. 7.

Figure 7B:
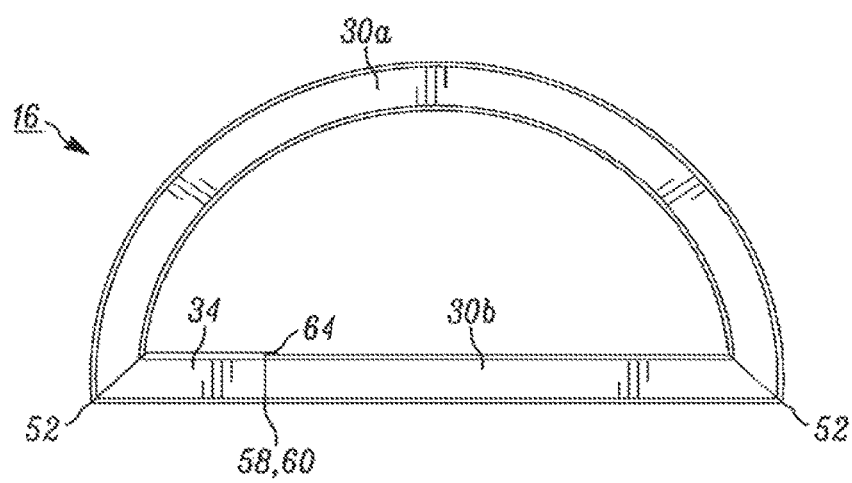
FIG. 7B is an elevation view of a two sided spacer frame constructed in accordance with another example embodiment of the present disclosure.

FIG. 7B is an elevation view of a two sided spacer frame assembly 16 constructed in accordance with another example embodiment of the present disclosure. The two sided 30a and 30b frame 16 includes a connecting structure or tab 34, a lateral connection 60 spaced from a corner, union point 58, and stops 64 of similar construction of the example embodiment of FIG. 7.

The configurable dimensions "a" and "b" (see FIG. 7) further provide assurance that the corner segments 32a-32d are all equally spaced and orthogonal, reducing any spacing or gaps on the lateral walls 42, 44, peripheral wall 40 in the space from corner union point 58 or lateral connection 60, thus reducing the opportunity for failure. Configurable dimensions "a", "b", and "c" are controlled by a controller or CPU in the firmware or software at the crimping station 108 (see FIGS. 2A, 4A, and 7), such that the tightest dimensions can be held at the lateral connection 60 and at the corner segments 32. In addition configurable dimensions $A_2$ and $L_3$ (see FIG. 10H) can be controlled by the firmware or software in a crimping machine to provide a greater seal between the tab 34 and last member 30d and for ease of assembly. Tab 34 profile is configurable through a mechanical setup, and it is therefore possible to control A1 (see FIG. 10H) in order to minimize the clearance between the back of the spacer and stiffening flanges 46, which will minimize clearance when the tab 34 is inserted into the spacer 54 of the final member 30d. This makes it possible to achieve a minimal clearance between the stiffening flanges 46 and the tab 34 when the spacer frame is assembled as shown in FIG. 10K.

In yet another example embodiment, the width w of the tab 34 varies to a tapered fit such that it is relatively thinner (or swaged by a crimping operation after roll forming) along length $L_1$ in FIGS. 10H and 10I for ease of assembly. That is, along length $L_1$, the width w of tab 34 is approximately 0.020" smaller than the opening 92 at the opposite end frame 54. Thus, the tab 34 is easily inserted into the last segment 30d as illustrated in FIGS. 10A-10C (in direction of arrow A). As the tab 34 proceed along its length $L_2$, the width $w_1$ of the tab widens as illustrated in FIGS. 10H and 10I, such that it becomes a snug fit between the tab and inner channel 92 formed in the last segment 30d, as further illustrated in FIGS. 10A-10C (in the direction of Arrows B to C). The snug or substantially press-fit continues until the opposite end frame 54 engages the stops 64 as illustrated in FIGS. 10C and 10D, eliminating any gaps around the profile of the lateral walls, 42, 44, and peripheral wall 40.

This tapered formation of the tab 34 occurs by swaging the front portion $L_1$ by, for example a crimping operation to make the width w of $L_1$ smaller than the width $w_1$ of $L_2$. As such, as the tab 34 enters the open channel 92, the resistance increases as the tab proceeds to enter the opening passed $L_1$ into the $L_2$ region as illustrated in FIG. 10I.

Figure 10E:
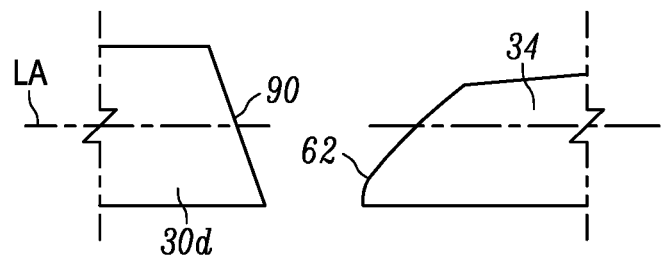
FIG. 10E is a side elevation view of different end profiles of a spacer frame assembly constructed in accordance with one example embodiment of the present disclosure.
Figure 10F:
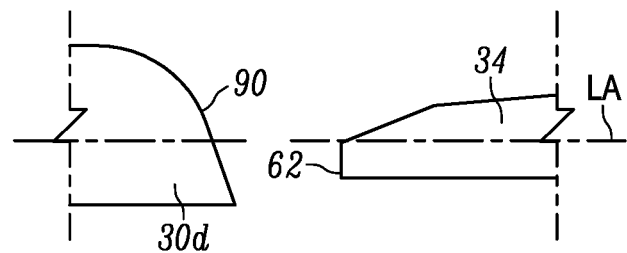
FIG. 10F is a side elevation view of different end profiles of a spacer frame assembly constructed in accordance with one example embodiment of the present disclosure.
Figure 10G:
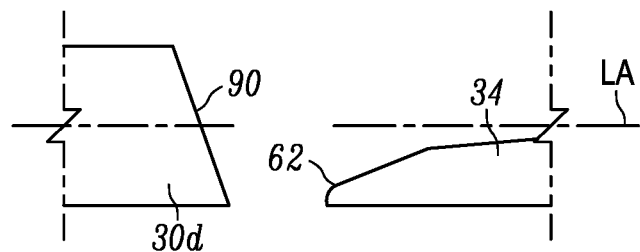
FIG. 10G is a side elevation view of different end profiles of a spacer frame assembly constructed in accordance with one example embodiment of the present disclosure.
Figure 10L:
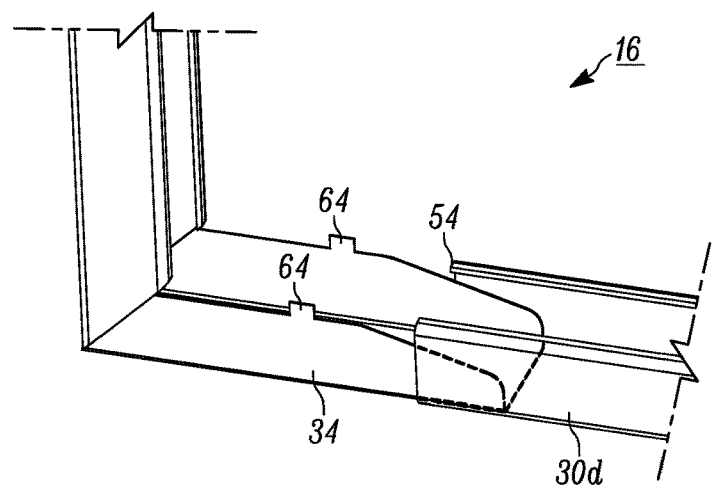
FIG. 10L is spacer frame having a stop constructed in accordance with another example embodiment of the present disclosure.

FIG. 10L is spacer frame having stops 64 of a spacer frame assembly 16 constructed in accordance with another example embodiment of the present disclosure. In particular, the stops 64 project or extend outwardly from the lateral walls 42 and 44 of the nose or connecting structure/tab 34 and engage the stiffening flanges 46 of the opposite end 54 of the connecting leg 30d. The stops 64 in FIG. 10L are constructed by the configuration of the dies in stamping station 104.

Figure 10M:
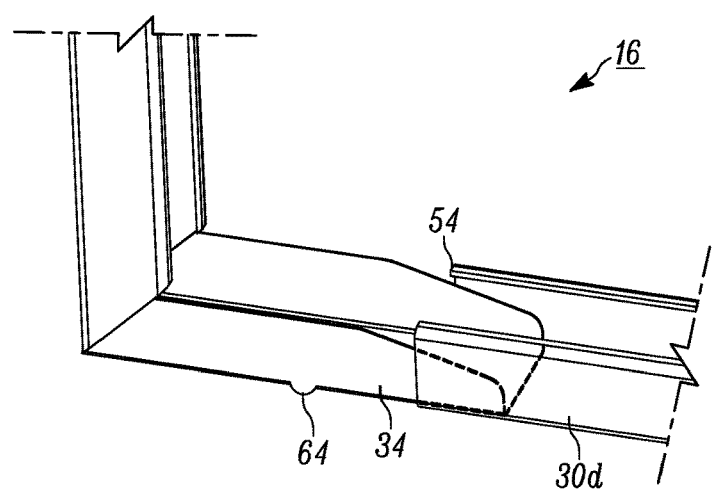
FIG. 10M is a spacer frame having a stop constructed in accordance with another example embodiment of the present disclosure.

FIG. 10M is a spacer frame having a stop 64 constructed in accordance with another example embodiment of the present disclosure. More particularly, the stop 64 extends outward and transversely to the peripheral wall 40 from the nose or tab 34. In the illustrated example embodiment, the stop 64 is a dent or bump formed without an opening in the peripheral wall by a pressing die in the production line 100. The stop 64 engages or contacts the corresponding side wall 42 of the opposite end 54 of the connecting leg 30d.

For the apertures 70, 72, alignment is important and in conventional spacer frames typically requires an awl for manual alignment. The apertures provide a gas passage before a fastener, such as a rivet (not shown) is installed. The fastener once installed in the auto-aligned apertures 70, 72 is covered with sealant material 18 so that the seal provided by each fastener is augmented by the sealant material. The fasteners in addition to sealing further assist in holding tab 34 in connection with leg member 30d.

Figure 9:
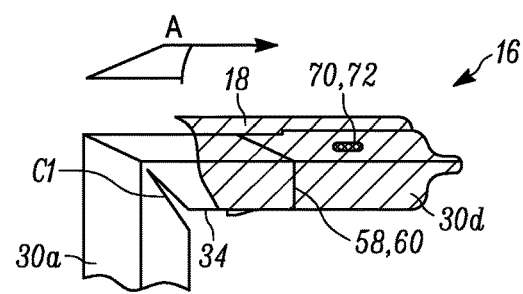
FIG. 9 is a perspective view of a spacer frame assembly having sealant added in a prescribed position in accordance with one example embodiment of the present disclosure.

As further illustrated in FIG. 9 the need for sealant 18 to cover the telescopic connection 58 advantageously placed only along the lateral connection 60, which along a single lateral direction (see arrow A in FIG. 9). Thus, the dual direction applying and wiping of the seal 18 in conventional spacer frames (see FIG. 1E directions A and B) is eliminated by the lateral connection 60 spaced away from the corner structures 32 of the present disclosure. And as such, the number of failures in the corners of the spacer frame of the present disclosure is significantly reduced. That is, the possibility of failure at any of the four corners C1, C2, C3, or C4 is minimal and the equally the same based on the construction (now that all the corners have the same and equal configuration) of the present disclosure and the addition of the lateral connection 60.

Figure 11:
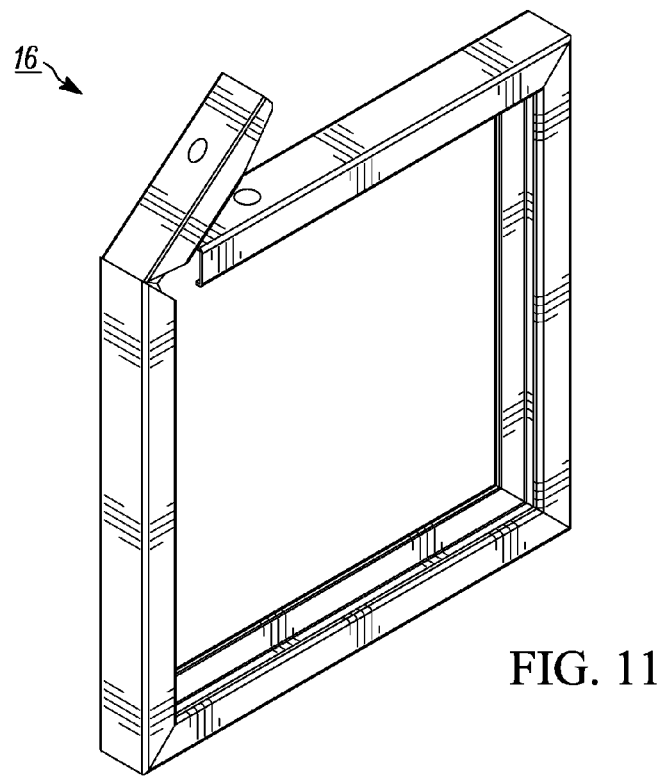
FIG. 11 is a left disassembled upper perspective view of a spacer frame assembly constructed in accordance with one example embodiment of the present disclosure.
Figure 12:
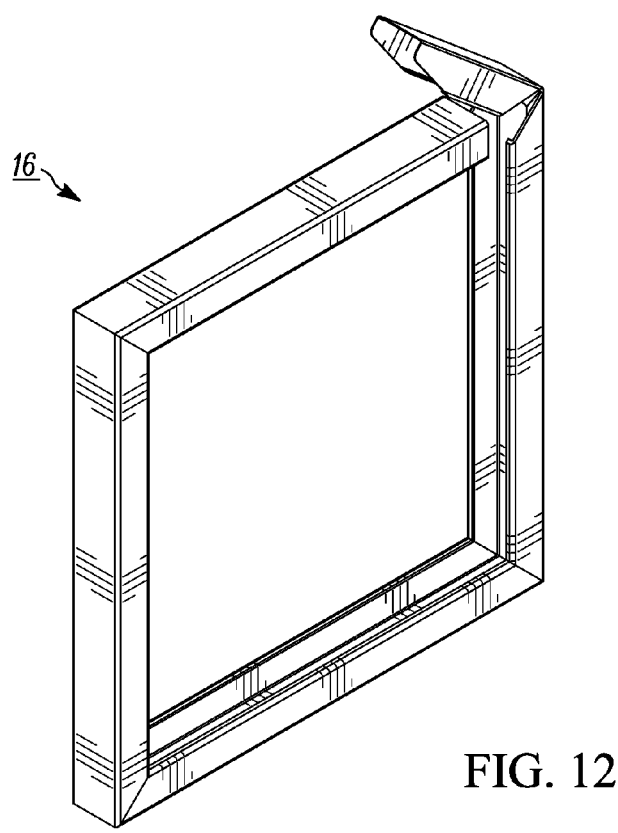
FIG. 12 is a right disassembled upper perspective view thereof.
Figure 13:
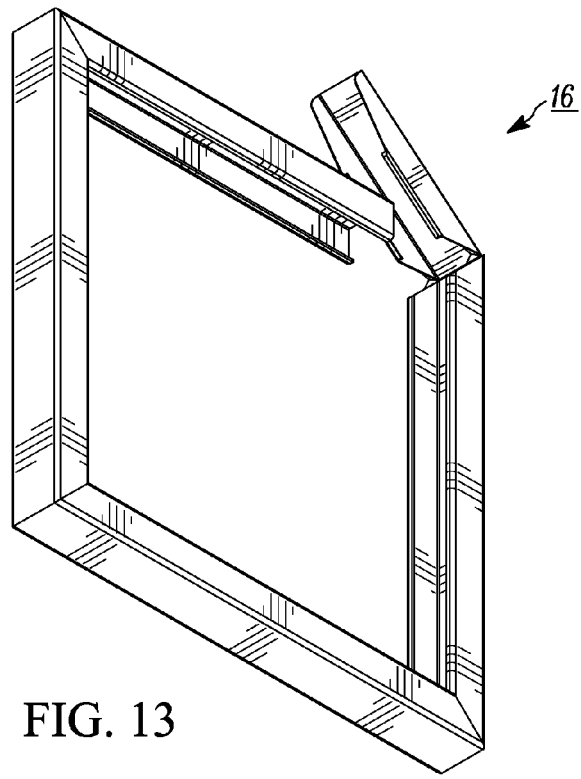
FIG. 13 is a right disassembled lower perspective view thereof.
Figure 14:
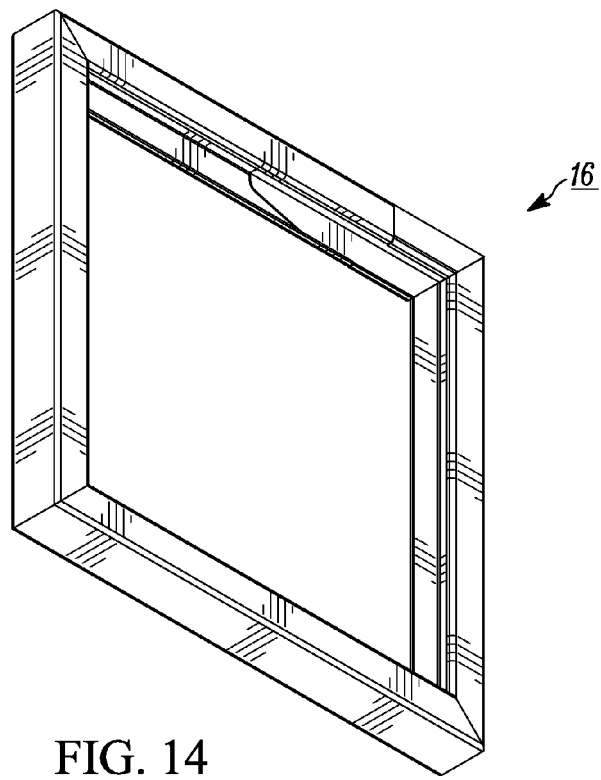
FIG. 14 is a right assembled lower perspective view of a spacer frame assembly constructed in accordance with another example embodiment of the present disclosure.
Figure 15:
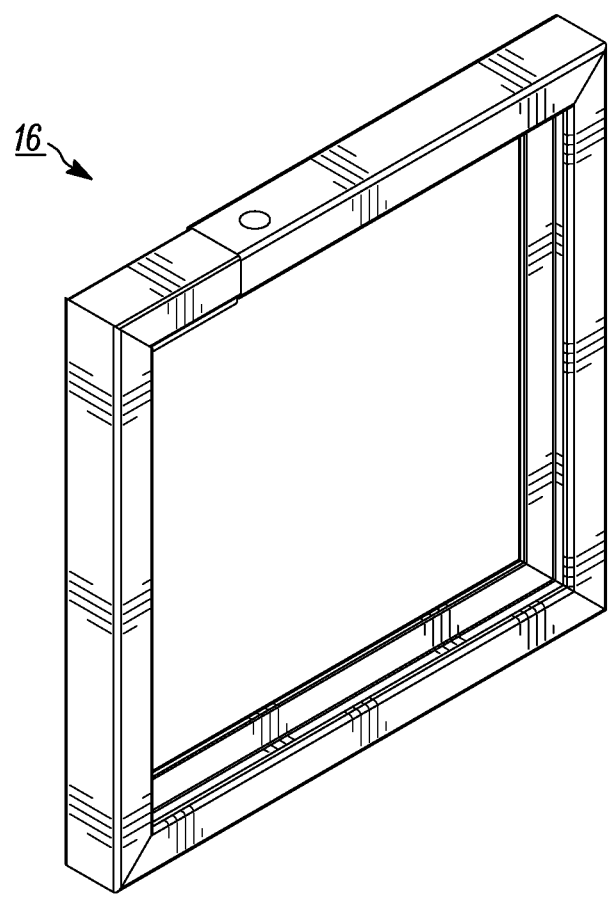
FIG. 15 is a left upper assembled perspective view thereof.
Figure 16:
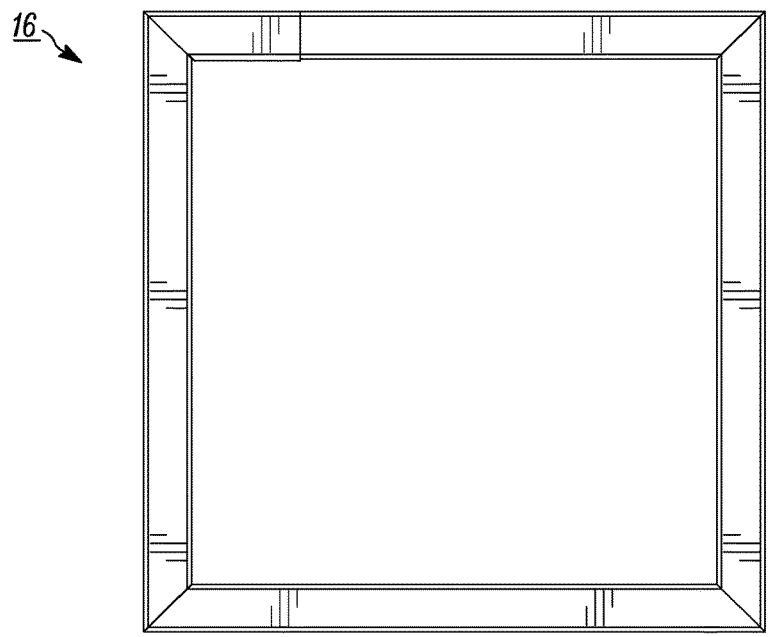
FIG. 16 is a front elevation view thereof.
Figure 17:
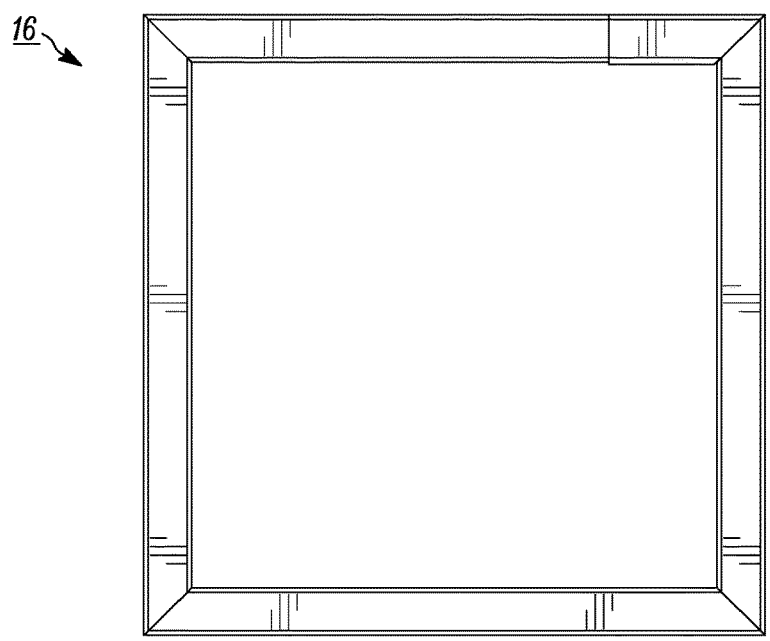
FIG. 17 is a rear elevation view thereof.
Figure 22:
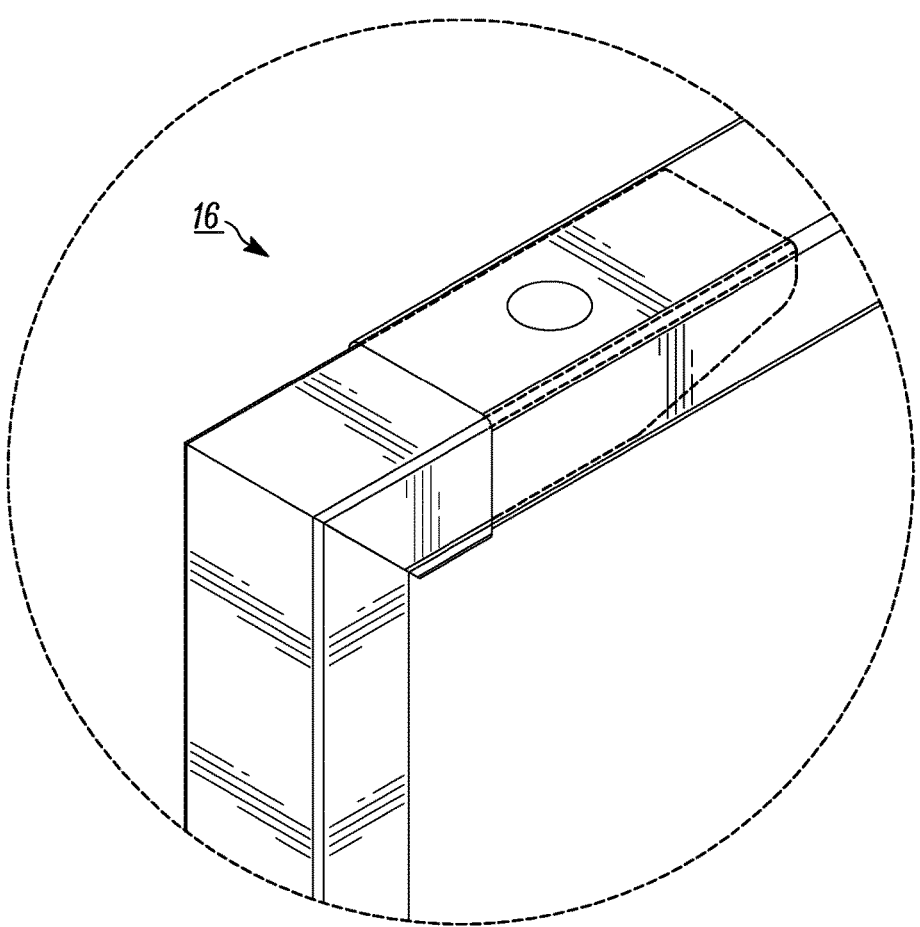
FIG. 22 is a magnified partial perspective view thereof.

Illustrated in FIGS. 11-13 are left and right disassembled perspective views of a spacer frame assembly constructed in accordance with one example embodiment of the present disclosure. Illustrated in FIGS. 14-22 is a spacer frame assembly constructed in accordance with another example embodiment of the present disclosure.

In yet another advantage of the present example embodiment is that the opposite frame end 54 of segment 30d is substantially orthogonal (see angle φ) about the lateral axis "LA" of the segment. As such, the possibility of a leak is reduced, because the overall opening is over a shorter amount compared to conventional spacer frames that have an angle α illustrated in FIG. 1A. In addition, the positive stop 64 of the tucking member 34 reassures that the aperture alignment between apertures 70 and 72 is perfectly concentric with each assembly. While yet in another example embodiment, the final member 30d is swaged or narrowed along dimension "e" (see FIGS. 4A and 4B) during roll forming such that the tab 34 has a tighter fit when inserted into the channel formed in the final member end 54 (see FIG. 10K) when compared to conventional connections (see FIG. 10J).

Illustrated in FIGS. 10E, 10F, and 10G are three different example embodiments exemplifying unique final member 30d end 90 constructions and nose 62 constructions of the tab 34. These various constructions permit different options for ease of assembly. In FIGS. 10E and 10G, the end 90 is chamfered or transverse about the lateral axis LA. While the end 90 could also be rounded as illustrated in FIG. 10F. FIGS. 10E and 10G illustrate a rounded nose 62 and a pointed nose, respectively. The nose 62 could also be orthogonal or blunted as illustrated in the example embodiment of FIG. 10F.

Failure in the spacer frame assembly 12 is further reduced by the identical construction of all four corners C1-C4 and the locating of the lateral connection 60 at a spaced distance (see FIG. 7) from any of the four corners. In addition, failure is reduced because dimensions "a" and "b" are configurable dimensions that can be increased or decreased unlike conventional spacer frames in which the connection was located at a respective corner of the spacer frame (see FIG. 1A-1E). Stated another way, on conventional spacer frame assemblies, the connection location could not be varied or configurable because the location of the web or stamp lines define the fold and corner that must match the web or stamp lines in the other remaining corners in order to have a substantially orthogonal frame. Therefore, any run-out existed in the corner connection of the conventional spacer frame, making such connection less robust.

Figure 23:
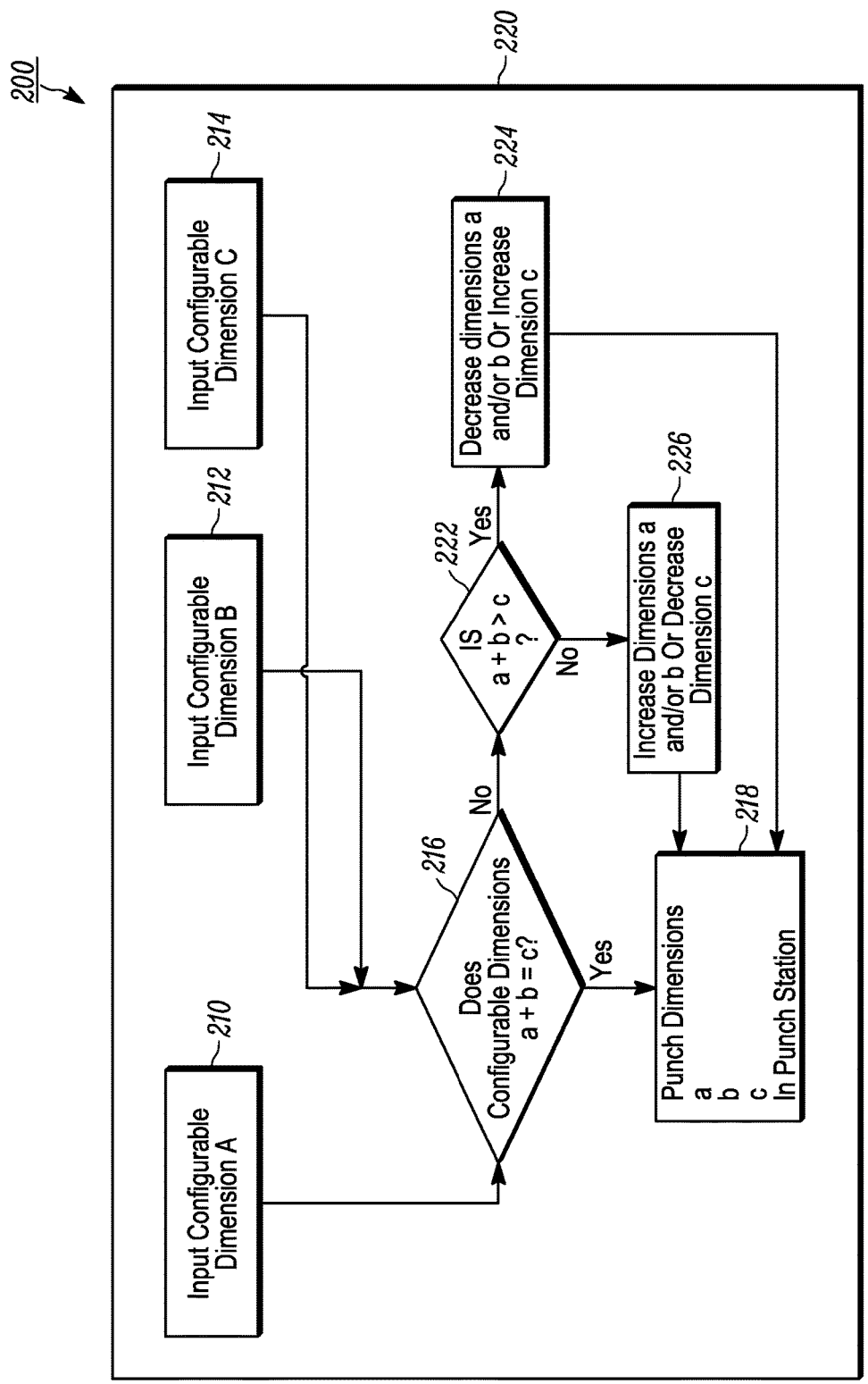
FIG. 23 is a flow diagram, illustrating the method for constructing a space frame assembly in accordance with one example embodiment of the present disclosure.

Illustrated in FIG. 23 is a flow diagram, illustrating a method 200 for constructing a spacer frame assembly 12 having configurable dimensions "a", "b" and "c" (see FIG. 7) 210, 212, 214, respectively in accordance with one example embodiment of the present disclosure. The configurable dimensions a, b, and c 210, 212, and 214 are controlled by a CPU or computer 220 in, for example the computer's hardware, software, firmware, and the like. Altering any of the configurable dimensions 210, 212, and 214 does not influence or change the construction of the corner structures 32. The method 200 receives the values or configurable dimensions for a, b, and c at 210, 212, and 214, respectively. The method at step 216 determines whether or not the sum of configurable dimensions a 210 and b 212 is equal to configurable dimension c 214. If the determination of step 216 is an affirmative, step 218 occurs in which the flat stock from a continuous coil 48 is advanced to a punch station (not shown) and configurable dimensions a 210, b 212, and c 214 are formed by punching dies to generate the punch strip 36 illustrated in FIG. 4A.

If the determination of step 216 is a negative, determination 222 is performed to determine whether configurable dimensions a 210 plus b 212 is greater than configurable dimension c. If the determination at step 222 is an affirmative, step 224 occurs in which configurable dimensions a 210 and/or b 212 is decreased or configurable dimension c is increased. After the changes to the configurable dimensions occurs at 224, step 218 as previously described is performed. If the determination at step 222 is negative, step 226 occurs in which configurable dimensions a 210 and/or b 212 is increased or configurable dimension c is decreased. After the changes to the configurable dimensions occurs at 226, step 218 as previously described is performed.

While a spacer frame assembly 16 having only a four-sided assembled construction is shown with a lateral connection 60 spaced from a corner C is shown, it should be appreciated that other polygons of more or less sides having a lateral connection is intended to be within the spirit and scope of the present claims and disclosure. In addition, the spacer frame assembly 16 further forms the union point 58 of the lateral connection 60 from a single integrally continuous punch strip 36 that is roll formed to form lateral walls 42, 44, peripheral wall 40, and stiffing flanges 46 throughout without the need for additional joiner clips.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of making a spacer frame assembly for bending into a multi-sided window or door spacer frame comprising:
    a) providing a supply of narrow metal strip coiled on a support;
    b) unwinding the metal strip from the support to provide an elongated metal strip and moving the elongated metal strip along a path of travel to a stamping station;
    c) stamping the strip at spaced apart corner locations by removing portions of said strip at said corner locations wherein inter-fitting leading and trailing ends of the spacer frame assembly are defined by a lead portion of said strip extending in front of a first corner location and a trailing portion of said strip extending behind a second corner location;
    d) additionally stamping at least one of the lead and trailing portions of said strip to form an abutment stop comprising a wide portion of the strip and a nose which extends into said wide portion of said strip for defining an amount of overlap of the leading and trailing ends in an assembled spacer frame;
    e) roll forming the strip to form a channel shaped structure having side walls that include the abutment stop and a base wall extending between the side walls; and
    f) severing the frame assembly from the elongated metal strip.

2. The method of claim 1 additionally comprising applying a sealant to outer surfaces of the side and base walls of said spacer frame assembly after severing the frame assembly from the elongated metal strip.

3. The method of claim 1 wherein the severing step forms an abutment engaging end of the spacer frame assembly.

* * * * *